United States Patent [19]

Becker et al.

[11] Patent Number: 5,834,541
[45] Date of Patent: Nov. 10, 1998

[54] OLEFIN POLYMER COMPOSITION HAVING LOW SMOKE GENERATION AND FIBER AND FILM PREPARED THEREFROM

[75] Inventors: Ronald F. Becker, Newark, Del.; Michael E. Starsinic, Elkton, Md.

[73] Assignee: Montell North America Inc., Wilmington, Del.

[21] Appl. No.: 850,881

[22] Filed: May 2, 1997

[51] Int. Cl.⁶ .................................................. C08K 5/49
[52] U.S. Cl. ................ 524/119; 524/236; 524/444; 524/451; 524/432; 524/433; 524/436; 264/331.15
[58] Field of Search .................... 524/119, 236, 524/444, 451, 432, 433, 436; 264/331.15

[56] References Cited

U.S. PATENT DOCUMENTS

| | | | |
|---|---|---|---|
| 3,302,454 | 2/1967 | Kleesattel | 73/67.1 |
| 4,318,845 | 3/1982 | Spivack et al. | 524/91 |
| 4,325,863 | 4/1982 | Hinsken et al. | 524/109 |
| 4,338,224 | 7/1982 | Hinsken et al. | 524/109 |
| 4,668,721 | 5/1987 | Seltzer et al. | 524/95 |
| 4,876,300 | 10/1989 | Seltzer et al. | 524/100 |
| 5,141,772 | 8/1992 | Chatterjee | 427/213 |
| 5,175,312 | 12/1992 | Dubs et al. | 549/307 |
| 5,212,246 | 5/1993 | Ogale | 525/240 |
| 5,236,962 | 8/1993 | Govoni et al. | 521/56 |
| 5,276,076 | 1/1994 | Pastor et al. | 524/119 |
| 5,326,802 | 7/1994 | Pastor et al. | 524/119 |
| 5,331,031 | 7/1994 | Pastor et al. | 524/119 |
| 5,344,860 | 9/1994 | Pastor et al. | 524/119 |
| 5,405,893 | 4/1995 | Pastor et al. | 529/119 |
| 5,409,992 | 4/1995 | Eppert, Jr. | 525/88 |
| 5,486,419 | 1/1996 | Clementini et al. | 428/397 |
| 5,625,090 | 4/1997 | Pastor et al. | 524/119 |

FOREIGN PATENT DOCUMENTS

WO 94/24344 10/1994 WIPO.

OTHER PUBLICATIONS

*Polypropylene Handbook* 190 (E. Moore, Jr. ed. 1996).
1993–94 *Plastics Compounding* 36.

*Primary Examiner*—Melvyn I. Marquis

[57] ABSTRACT

A polymer composition and fiber, film or sheet prepared therefrom, which contains (i) an olefin polymer containing an acid neutralizing agent other than a metallic salt of a saturated or unsaturated fatty acid, and ii) a stabilizer system distributed throughout the polymer, the stabilizer system including (a) a phosphite selected from 2,2',2"-nitrilo[triethyl-tris(3,3',5,5'-tetra-tert.butyl-1,1-biphenyl-2,2'-diyl) phosphite] and tris(2,4-di-tert-butylphenyl) phosphite; and (b) a N,N-dialkylhydroxylamine. Also disclosed is a method for preparing a polyolefin fiber, film or sheet, which includes adding the above stabilizer to an olefin polymer containing an acid neutralizing agent other than a metallic salt of a saturated or unsaturated fatty acid, thereby producing a stabilized olefin polymer; and extruding the stabilized olefin polymer through a die.

20 Claims, No Drawings

OLEFIN POLYMER COMPOSITION HAVING LOW SMOKE GENERATION AND FIBER AND FILM PREPARED THEREFROM

BACKGROUND OF THE INVENTION

Olefin polymers, especially polypropylene, are commonly spun into fibers, film or sheet by extruding molten polymer through die orifices such as a spinnerette, film or sheet dies, quenching the molten filament, film or sheet, orienting the filament, fiber or sheet, and heat setting the oriented filament, film or sheet prior to winding upon a bobbin. A problem associated with polyolefins produced using Ziegler-Natta type catalysts is the generation of visible "smoke" during melt extrusion of polyolefin during fiber spinning and film extrusion operations. The "smoke" evolves at the die, and is believed to comprise volatile organic compounds in the 20–50 carbon atom range. These evolved volatile organic compounds subsequently condense and coat equipment with resultant problems of non-uniformity of non-woven fabrics formed from such fibers or of films due to die deposits caused by the volatile organic compounds.

Efforts to reduce or eliminate smoke have been partially successful at best. Minimizing both melt temperature and extruder residence time below certain levels can create processing problems. Devolatilizing the polymer feedstock by heating prior to extrusion can reduce smoke generation by about 20% In contrast, the present invention can reduce smoke by up to 90% percent or more.

The incorporation of various additives into and/or onto olefin polymer materials to improve thermal stability, UV resistance, and processability is known. For example, the inclusion of an acid neutralizing agent in olefin polymer compositions is necessary due to small amounts of catalyst residues contained within the olefin polymer. These catalyst residues can cause corrosion of processing equipment such as mold surfaces and die lips. The addition of an appropriate acid neutralizing agent can eliminate or at least reduce the potential for corrosion due to such residues.

However, the selection of acid neutralizing agent is important because it can affect the overall acidity/basicity of an olefin polymer composition and influence the reactions of many of the organic additives in the polymer composition. In addition, the polyolefin's release properties can be affected by the acid neutralizing agent.

In practice, metallic stearates such as sodium, calcium and zinc are commonly added to olefin polymer materials as an acid neutralizing agent, with calcium stearate being the most common. Although other acid neutralizing agents are known, calcium stearate is predominately used due to the fact that it functions as an external lubricant and processing aid in addition to acting as an acid neutralizing agent.

Phosphite compounds, including 2,2',2"-nitrilo[triethyl-tris(3,3',5,5'-tetra-tert.butyl-1,1-biphenyl-2,2'-diyl) phosphite] are typically added to polyolefin compositions to stabilize them against thermal and oxidative degradation. Various forms of 2, 2', 2"-nitrilo[triethyl-tris(3,3',5,5'-tetra-tert.butyl-1,1-biphenyl-2, 2'-diyl)phosphite] are known. For example, U.S. Pat. No. 5,326, 802 discloses a beta crystalline modification of 2,2',2'-nitrilo [triethyl-tris(3,3',5,5'-tetra-tert.butyl-1,1-biphenyl-2,2'-diyl) phosphite]. Example 6 discloses the stabilization of polypropylene which also contains calcium stearate. U.S. Pat. Nos. 5,331,031 and 5,405,893 disclose a gamma crystalline modification of 2,2',2"-nitrilo[triethyl-tris(3,3',5,5'-tetra-tert.butyl-1,1-biphenyl-2,2'-diyl)phosphite]. Example 4 illustrates the stabilization of polypropylene which also contains calcium stearate. An amorphous solid modification of 2,2',2"-nitrilo [triethyl-tris(3,3',5,5'-tetra-tert.butyl-1,1-biphenyl-2,2'-diyl) phosphite] is disclosed by U.S. Pat. No. 5,276,076. Example 3 illustrates the stabilization of polypropylene which also contains calcium stearate.

The use of N,N-dialkylhydroxylamines to stabilize polyolefins is also known. Thus, U.S. Pat. No. 4,668,721 discloses that hydroxylamine derivatives may be used to stabilize polyolefin compositions against degradation due to extrusion, exposure to the combustion products of natural gas, gamma radiation or upon storage. The hydroxylamine derivative may have a chemical structure which conforms to one of fourteen structural formulae. In Example 21, a combination of hydroxylamine and calcium stearate is said to be far superior to hydroxylamine alone with respect to the yellowing resistance of polypropylene processed at 260° C.

U.S. Pat. No. 4,876,300 discloses that long chain N,N-dialkylhydroxylamines can be used as process stabilizers for polyolefin compositions in order to minimize discoloration and melt flow rate increase due to extrusion.

International Patent Publication No. WO 94/24344 discloses a polypropylene stabilized with an effective amount of a selected hindered amine, a selected N,N-dialkylhydroxylamine, and a phosphite which may be 2,2', 2"-nitrilo[triethyl-tris(3,3',5,5'-tetra-tert.butyl-1,1-biphenyl-2,2'-diyl)]phosphite. The polypropylene composition is free or essentially free of any traditionally used phenolic antioxidant, and is said to possess enhanced light stability, enhanced long term heat stability and especially enhanced gas fade stability. All of the formulations disclosed in the examples contain calcium stearate.

An object of the invention is to provide an olefin polymer composition which generates a minimum amount of smoke during extrusion into a fiber, film or sheet.

Another object of the invention is to provide a low smoke olefin polymer composition which is stabilized against thermal and oxidative degradation, and the fiber, film or sheet prepared therefrom.

Yet another object of the invention is to provide a method for reducing volatile organic compounds generated during polyolefin fiber, film or sheet production by up to 90 percent.

BRIEF SUMMARY OF THE INVENTION

In one aspect, the present invention relates to a polymer composition comprising:
(i) an olefin polymer containing an acid neutralizing agent other than a metallic salt of a saturated or unsaturated fatty acid, and
ii) a stabilizer system distributed throughout the polymer, the stabilizer system comprising
  (a) a phosphite selected from the group consisting of 2,2',2"-nitrilo[triethyl-tris(3,3',5,5'-tetra-tert.butyl-1, 1-biphenyl-2,2'-diyl)phosphite] and tris(2,4-di-tert-butylphenyl) phosphite; and
  (b) a N,N-dialkylhydroxylamine, a benzofuranone or mixtures thereof.

In another aspect, the present invention relates to a method for preparing an olefin polymer fiber, film or sheet comprising
  i) incorporating a stabilizer system into and/or onto an olefin polymer containing an acid neutralizing agent other than calcium stearate, the stabilizer system comprising
    (a) a phosphite selected from the group consisting of 2,2',2"-nitrilo[triethyl-tris(3,3',5,5'-tetra-tert.butyl-1, 1-biphenyl-2,2'-diyl)phosphite] and tris(2,4-di-tert-butylphenyl) phosphite; and (b) a N,N-dialkylhydroxylamine, a benzofuranone or mixtures thereof thereby producing a stabilized olefin polymer; and ii) extruding the stabilized olefin polymer through a die, thereby producing an olefin polymer fiber, film or sheet.

DETAILED DESCRIPTION OF THE PREFERRED EMBODIMENTS

The inventor has unexpectedly discovered that smoke generation during fiber, film and sheet processing can be significantly reduced by using (1) a combination of N,N-dialkylhydroxylamine and a specific phosphite stabilizer to melt stabilize a controlled rheology olefin polymer, and (2) an acid neutralizing agent other than a metallic salt of a saturated or unsaturated fatty acid.

Controlled rheology olefin polymers are prepared by polymerizing olefin monomers to a relatively high weight average molecular weight, which are then treated ("visbroken") with peroxide to reduce their molecular weight to a desired average. Alternately, controlled rheology polymers can be prepared by employing a Ziegler-Natta catalyst system known to provide the desired weight average molecular weight and by using a sufficient amount of chain transfer agent, such as hydrogen, during the polymerization to achieve the desired melt flow rate.

The olefin polymer is derived by polymerizing at least one mono-$\alpha$-olefin, such as ethylene, propylene, isobutylene, butene-1, 3-methyl-1-butene and 4-methyl-1-pentene. Polyethylene, both homopolymer and copolymer, may be for example medium density, high density or linear low density polyethylene.

Copolymers of mono-$\alpha$-olefins may also be used in the instant compositions, for example ethylene/propylene copolymers, propylene/butene-1 copolymers, propylene/octene-1 copolymers, ethylene/butene-1 copolymers, ethylene/octene-1 copolymers as well as ethylene/vinyl acetate copolymers.

Heterophasic or impact modified olefin polymers may also be used in the compositions of this invention. Suitable heterophasic olefin polymers include a) an olefin polymer composition comprising:
  (i) about 10 parts to about 60 parts by weight of a crystalline propylene hompolymer having an isotactic index greater than 80, or a crystalline copolymer selected from the group consisting of (a) propylene and ethylene, (b) propylene, ethylene and a $C_4$–$C_8$ $\alpha$-olefin, and (c) propylene and a $C_4$–$C_8$ $\alpha$-olefin, the copolymer having a propylene content of more than 85% by weight and an isotactic index greater than 85;
  (ii) about 5 parts to about 25 parts by weight of a copolymer of ethylene and propylene or a $C_4$–$C_8$ $\alpha$-olefin that is insoluble in xylene at ambient temperature; and
  (iii) about 30 parts to about 70 parts by weight of an elastomeric copolymer selected from the group consisting of (a) ethylene and propylene, (b) ethylene, propylene, and a $C_4$–$C_8$ $\alpha$-olefin, and (c) ethylene and a $C_4$–$C_8$ $\alpha$-olefin, the copolymer optionally containing about 0.5% to about 10% by weight of a diene, and containing less than 70% by weight of ethylene and being soluble in xylene at ambient temperature and having an intrinsic viscosity of about 1.5 to about 4.0 dl/g;

the total of (ii) and (iii), based on the total olefin polymer composition being from about 50% to about 90%, and the weight ratio of (ii)/(iii) being less than 0.4, wherein the composition is prepared by polymerization in at least two stages and has a flexural modulus of less than 150 MPa;

(b) an olefin polymer comprising:
  (i) about 10% to about 60% of a propylene homopolymer having an isotactic index greater than 80, or a crystalline copolymer selected from the group consisting of (a) ethylene and propylene, (b) ethylene, propylene and a $C_4$–$C_8$ $\alpha$-olefin, and (c) ethylene and a $C_4$–$C_8$ $\alpha$-olefin, the copolymer having a propylene content greater than 85% and an isotactic index greater than 85%;
  (ii) about 20% to about 60% of an amorphous copolymer selected from the group consisting of (a) ethylene and propylene, (b) ethylene, propylene, and a $C_4$–$C_8$ $\alpha$-olefin, and (c) ethylene and a $C_4$–$C_8$ $\alpha$-olefin, the copolymer optionally containing about 0.5% to about 10% of a diene and containing less than 70% ethylene and being soluble in xylene at ambient temperature; and
  (iii) about 3% to about 40% of a copolymer of ethylene and propylene or a $C_4$–$C_8$ $\alpha$-olefin that is insoluble in xylene at ambient temperature;

wherein the composition has a flexural modulus of greater than 150 but less than 1200 MPa, preferably 200 to 1100 MPa, most preferably 200 to 1000 MPa; and (c) an olefin polymer composition comprising:
  (i) about 30% to about 98% of a polymeric material selected from the group consisting of a polypropylene homopolymer having an isotactic index greater than 90, and a crystalline copolymer having an isotactic index greater than 85 of propylene and at least one $\alpha$-olefin of the formula $CH_2$=$CHR$, where R is H or a $C_2$–$C_6$ alkyl group, the $\alpha$-olefin being less than 10% of the copolymer when R is H and being less than 20% when R is a $C_2$–$C_6$ alkyl group or a combination thereof with R=H, and
  (ii) about 2% to about 70% of an elastomeric copolymer of propylene and an $\alpha$-olefin of the formula $CH_2$=$CHR$, where R is H or a $C_2$–$C_8$ alkyl group, the $\alpha$-olefin being about 45% to about 75% of the elastomeric copolymer, and about 10% to about 40% of the elastomeric copolymer being insoluble in xylene at ambient temperature, or an elastomeric copolymer of ethylene and a $C_4$–$C_8$ $\alpha$-olefin having an $\alpha$-olefin content of about 15% to about 60%.

As used herein, room or ambient temperature is approximately 25° C.

The total amount of polymerized ethylene in (a) is preferably about 10 to about 40% by weight.

The $C_{4-8}$ $\alpha$-olefins useful in the preparation of (a) and (b) include, for example, butene-1; pentene-1; hexene-1; 4-methyl-1-pentene, and octene-1.

The diene, when present, is typically a butadiene, 1,4-hexadiene; 1,5-hexadiene, or ethylidenenorbornene.

Propylene polymer materials (a) and (b) can be prepared by polymerization in at least two stages, where in the first stage the propylene, or propylene and ethylene or an $\alpha$-olefin, or propylene, ethylene and an $\alpha$-olefin are polymerized to form component (i) of (a) or (b), and in the following stages the mixtures of ethylene and propylene or the $\alpha$-olefin, or ethylene, propylene and the $\alpha$-olefin, and optionally a diene, are polymerized to form components (ii) and (iii) of (a) and (b).

The polymerization of (a) and (b) can be conducted in liquid phase, gas phase, or liquid-gas phase using separate reactors, all of which can be done either by batch or continuously. For example, it is possible to carry out the polymerization of component (i) using liquid propylene as a diluent, and the polymerization of components (ii) and (iii) in gas phase, without intermediate stages except for the partial degassing of the propylene. All gas phase is the preferred method.

The preparation of propylene polymer material (a) is described in more detail in U.S. Pat. Nos. 5,212,246 and 5,409,992, which preparation is incorporated herein by reference. The preparation of propylene polymer material (b) is described in more detail in U.S. Pat. Nos. 3,302,454 and 5,409,992, which preparation is incorporated herein by reference.

The polymer composition (c) can be obtained by sequential polymerization of monomers in the presence of Ziegler-Natta catalysts, or by mechanical blending of components (i) and (ii). Such a sequential polymerization is described in more detail in U.S. Pat. No. 5,486,419, which preparation is incorporated herein by reference.

The sequential polymerization can also be carried out with a mixture of Ziegler-Natta and metallocene catalysts or by using a Ziegler-Natta catalyst in one reactor, preferably the first reactor, and a metallocene catalyst in the other reactor(s), preferably the reactor(s) after the first reactor.

Mixtures of the homopolymers or mixtures of olefin copolymers or mixtures of both can be used.

The olefin polymer is preferably a crystalline propylene polymer, most preferably either a crystalline propylene homopolymer having an isotactic index greater than 90, most preferably greater than 93, or a crystalline, random copolymer of propylene and either ethylene or $C_4$–$C_{10}$ α-olefin with an isotactic index greater than 85. The propylene polymer is preferably visbroken to a melt flow rate ("MFR") of 15–50 g/10 minutes, most preferably 25–38 g/10 minutes, measured according to ASTM 1238, Condition L. Such propylene polymers are commercially available from Montell USA Inc.

The polymer composition of the present invention contains an acid neutralizing agent other than a metal salt of a saturated or unsaturated fatty acid, particularly, metallic stearates and especially calcium stearate. Fatty acids typically have 4 to 22 carbon atoms with a terminal carboxyl group (COOH). Typical metals are those in Group la and II of the Periodic Table.

Suitable acid neutralizing compounds for use in the present invention include hydrotalcites, aluminum silicate, and oxides and hydroxides of Group II metals. Calcium lactate, calcium hydroxide, calcium oxide or mixtures thereof are most preferred. Hydrotalcite containing calcium stearate is not preferred.

An effective amount of the acid neutralizing agent will range from 50 to 2000 ppm polymer, preferably 250 to 1,000 ppm polymer. In the case of polypropylene, a preferred amount of acid neutralizing agent ranges from 200 to 300 ppm polymer.

The process of visbreaking a propylene polymer material is well known to those skilled in the art. Generally, it is performed as follows: propylene polymer in particulate form, e.g., "as polymerized" flake or pelletized, has sprayed thereon or blended therewith, a prodegradant or free radical generating source, e.g., a peroxide in liquid or powder form or absorbed on and/or in a carrier, e.g., polypropylene/peroxide concentrate. The propylene polymer and peroxide or propylene polymer/peroxide concentrate is then introduced into a means for thermally plasticizing or melt blending and conveying the mixture, e.g., an extruder at elevated temperature. Residence time and temperature are controlled in relation to the particular peroxide selected (i.e., based on the half-life of the peroxide at the process temperature of the extruder) so as to effect the desired degree of polymer chain degradation. The net result is to narrow the molecular weight distribution of the propylene polymer as well as to reduce the overall molecular weight and thereby increase the MFR relative to the as-polymerized propylene polymer. For example, a propylene polymer with a fractional MFR (i.e., less than 1), or a propylene polymer with a MFR of 0.5–10 g/10 minutes, can be selectively visbroken to a MFR of 15–50, preferably 25–38 g/10 minutes, by selection of peroxide type, extruder temperature and extruder residence time without undue experimentation. Sufficient care should be exercised in the practice of the procedure to avoid crosslinking in the presence of an ethylene-containing copolymer; typically, crosslinking will be avoided where the ethylene content of the copolymer is sufficiently low.

The phosphite stabilizer can be either 2,2',2"-nitrilo [triethyl-tris(3,3',5,5'-tetra-tert.butyl-1,1-biphenyl-2,2'-diyl) phosphite] or tris(2,4-di-tert-butylphenyl) phosphite. Both of these compounds are commercially available. The preparation of 2,2',2"-nitrilo[triethyl-tris(3,3',5,5'-tetra-tert.butyl-1,1-biphenyl-2,2'-diyl)phosphite] is disclosed in U.S. Pat. No. 4,318,845, the disclosure of which is incorporated herein by reference in its entirely.

The N,N-dialkylhydroxylamine must have a hydroxyl group bonded to the nitrogen atom, and preferably conforms to the formula:

$$R_1R_2NOH$$

wherein $R_1$ and $R_2$ are independently $C_{1-36}$ alkyl, which is unsubstituted or substituted with hydroxyl. Illustrative hydroxylamines which come within the above formula include N,N-distearylhydroxylamine and di(hydrogenated tallow) amine.

A typical di(hydrogenated tallow)amine has the following distribution of alkyl substituents:

| | $R_1R_2NH$ | |
|---|---|---|
| $R_1$ | $R_2$ | % |
| $C_{16}$ | $C_{14}$ | 1.9 |
| $C_{16}$ | $C_{16}$ | 12.4 |
| $C_{16}$ | $C_{17}$ | 2.8 |
| $C_{16}$ | $C_{18}$ | 36.0 |
| $C_{17}$ | $C_{18}$ | 3.9 |
| $C_{18}$ | $C_{18}$ | 39.0 |
| other | | 4.0 |

The di(hydrogenated tallow)amine originating from animal sources may well vary somewhat in the specific distribution of alkyl substituents, but the di(hydrogenated tallow) amine contains major amounts of N,N-dihexadecylamine, N,N-dioctadecylamine and N-hexadecyl-N-octadecylamine. The individual components of the mixture can be separated by distillation under high vacuum.

However, for the purposes of this invention, there is no need to carry out such separation and the hydroxylamine prepared from the di(hydrogenated tallow)amine is a preferred embodiment of the present invention.

The long chain N,N-dialkylhydroxylamines can be prepared by a number of methods. These include (a) the oxidation of the corresponding secondary amine with aqueous hydrogen peroxide to form the desired N,N-dialkylhydroxylamine directly; (b) the addition of the secondary amine to an alpha, beta-unsaturated compound such as an alkyl acrylate to form a Michael addition product, which is in turn oxidized to the corresponding tertiary amine oxide using aqueous hydrogen peroxide, and followed by the elimination of the alpha,beta-unsaturated compound by the Cope reaction to give the N,N-dialkylhydroxylamine; (c) the metathesis reaction between an alkyl halide and a hydroxylamine in the presence of alkali such as sodamide; and (d) the reaction of an amine with a peroxy compound, such as benzoyl peroxide, followed by saponification of the intermediate formed to the desired hydroxylamine derivative.

In another embodiment, benzofuran-2-ones can be used instead of the hydroxylamine derivative or admixed with the hydroxylamine derivative.

Suitable benzofuran-2-ones and processes for making them are described in U.S. Pat. Nos. 4,325,863, 4,338,224, 5,175,312 and 5,344,860, the disclosures of which are incorporated by reference. Examples of such benzofuran-2-ones are compounds of the formula

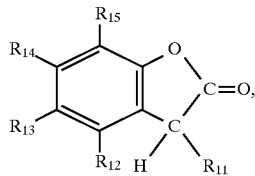

in which
$R_{11}$ is phenyl or phenyl which is substituted by 1 to 3 alkyl radicals together having at most 18 carbon atoms, alkoxy having 1 to 12 carbon atoms, alkoxycarbonyl having 2 to 18 carbon atoms or chlorine;
$R_{12}$ is hydrogen;
$R_{14}$ is hydrogen, alkyl having 1 to 12 carbon atoms, cyclopentyl, cyclohexyl or chlorine;
$R_{13}$ has a meaning of $R_{12}$ or $R_{14}$ or is a radical of the formula

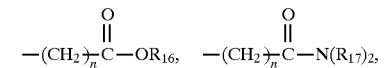

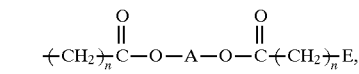

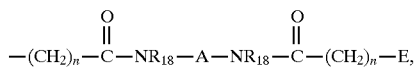

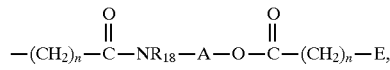

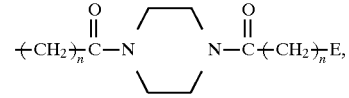

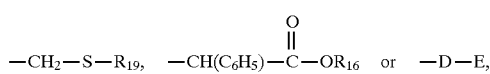

in which
$R_{16}$ is hydrogen, alkyl having 1 to 18 carbon atoms, alkyl having 2 to 18 carbon atoms which is interrupted by oxygen or sulfur, dialkylaminoalkyl having a total of 3 to 16 carbon atoms, cyclopentyl, cyclohexyl, phenyl or phenyl which is substituted by 1 to 3 alkyl radicals together having at most 18 carbon atoms;
n is 0, 1 or 2;

the substituents $R_{17}$, independently of one another, are hydrogen, alkyl having 1 to 18 carbon atoms, cyclopentyl, cyclohexyl, phenyl, phenyl which is substituted by 1 or 2 alkyl radicals together having at most 16 carbon atoms, a radical of the formula $-C_2H_4OH$, $-C_2H_4-O-C_mH_{2m+1}$ or

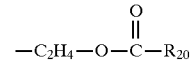

or together with the nitrogen atom to which they are attached form a piperidine or morpholine radical;
m is 1 to 18;
$R_{20}$ is hydrogen, alkyl having 1 to 22 carbon atoms or cycloalkyl having 5 to 12 carbon atoms;
A is alkylene having 2 to 22 carbon atoms which may be interrupted by nitrogen, oxygen or sulfur;
$R_{18}$ is hydrogen, alkyl having 1 to 18 carbon atoms, cyclopentyl, cyclohexyl, phenyl, phenyl which is substituted by 1 or 2 alkyl radicals together having at most 16 carbon atoms, or is benzyl;
$R_{19}$ is alkyl having 1 to 18 carbon atoms;
D is $-O-$, $-S-$, $-SO-$, $-SO_2-$ or $-C(R_{21})_2-$;
the substituents $R_{21}$, independently of one another, are hydrogen, $C_1$–$C_{16}$ alkyl, the two $R_{21}$ together containing 1 to 16 carbon atoms, $R_{21}$ is furthermore phenyl or a radical of the formula

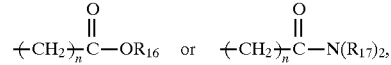

in which n, $R_{16}$ and $R_{17}$ are as defined above;
E is a radical of the formula

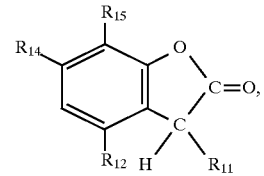

in which $R_{11}$, $R_{12}$ and $R_{14}$ are as defined above; and
$R_{15}$ is hydrogen, alkyl having 1 to 20 carbon atoms, cyclopentyl, cyclohexyl, chlorine or a radical of the formula

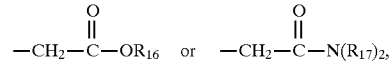

in which $R_{16}$ and $R_{17}$ are as defined above, or $R_{15}$ together with $R_{14}$ forms a tetramethylene radical.

Preference is given to those benzofuran-2-ones in which $R_{13}$ is hydrogen, alkyl having 1 to 12 carbon atoms, cyclopentyl, cyclohexyl, chlorine or a radical of the formula

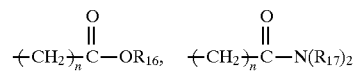

or $-D-E$, in which n, $R_{16}$, $R_{17}$, D and E are as defined above, $R_{16}$ is in particular hydrogen, alkyl having 1 to 18 carbon atoms, cyclopentyl or cyclohexyl.

Preference is given furthermore to those benzofuran-2-ones in which $R_{11}$ is phenyl or phenyl which is substituted by 1 or 2 alkyl radicals together having at most 12 carbon atoms; $R_{12}$ is hydrogen; $R_{14}$ is hydrogen or alkyl having 1 to 12 carbon atoms; $R_{13}$ is hydrogen, alkyl having 1 to 12 carbon atoms,

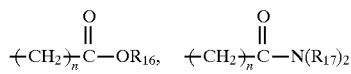

or —D—E; $R_{15}$ is hydrogen, alkyl having 1 to 20 carbon atoms,

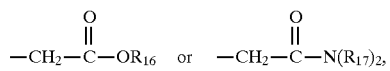

or $R_{15}$ together with $R_{14}$ forms a tetramethylene radical, n, $R_{16}$, $R_{17}$, D and E being a defined at the beginning.

An effective amount of the stabilizer system will typically range from 250 to 2000 ppm polymer, with a preferred amount being 700 to 1500 ppm polymer. The stabilizer system may contain from 5 to 80% N,N-dialkylhydroxylamine, benzofuranone or mixtures thereof and 95 to 20% phosphite, preferably 5 to 45% and 95 to 55%, and most preferably 5 to 25% and 95 to 75 wt. %.

When mixture of the hydroxylamine derivative and the benzo-furan-2-one are used, they can be in amounts from 5 to 95 wt. %.

The stabilizer system of the present invention may also contain at least one other stabilizer compound. For example, another phosphite compound may used in partial substitution of the primary phosphite stabilizer compounds for economic reasons. However, the inventor has discovered that such a substitution can only be partial (i.e. around 50%); full replacement of the primary phosphite compounds will significantly increase smoke generation. Suitable phosphite partial replacements include tris(2,4-di-tert-butylphenyl) phosphite and 2,4,6-tri-tert-butylphenyl-2-butyl-2-ethyl-1,3-propanediol phosphite.

The stabilizer system can also include conventional stabilizer compounds with little or no adverse affect on smoke generation. For example, a hindered amine light stabilizer (HALS) can be added to the stabilizer system. Suitable HALS include poly[6-[(1,1,3,3-tetramethyl-butyl)amino-s-triazine 2,4-yl]2,2,6,6-tetramethyl-4-piperidyl)imino] hexamethylene [(2,2,6,6,-tetramethyl-4-piperidyl)imino] and 1,3,5-triazine-2,4,6,-triamine-N,N"-[1,2-ethanedylbis[N-(3-[4,6-bis-(butyl-1,2,2,6,6-pentamethyl-4-piperidinyl)amine] propyl-[N,N-dibutyl-N,N-bis(1,2,2,6,6-pentamethyl-4-piperidinyl). Similarly, phenolic stabilizers such as octadecyl-3,5-di-tert.butyl-4-hydroxyhydrocinnamate and tetrakis [methylene 3-(3',5'-di-tert-butyl-4'-hydroxyphenyl) propionate]-methane may be added to increase thermal stability.

The stabilized polyolefin composition may contain other additives as appropriate for the intended use of the composition. Such additives include antistatic agents, flameproofing agents, antiblocking agents, lubricants, pigments, optical brighteners, nucleators and clarifiers.

The stabilizer system components may be incorporated into the olefin polymer in any conventional manner, such as by dry blending the stabilizer system directly with polymer pellets, by means of tumble mixers and Henschel blenders. Solutions, emulsions or slurries of the stabilizer system can be sprayed onto or admixed with granular polymer. For example, the stabilizer components can be coated upon granules of the olefin polymer in a fluidized bed according to the process of U.S. Pat. No. 5,141,772, the disclosure of which is incorporated herein in its entirety. The stabilizer components can also be blended with molten polymer by means of a Banbury mixer, Bradbender mixer, roll mill or screw extruder.

The stabilizer system can also be added to the olefin polymer in the form of a masterbatch according to the conventional techniques discussed in U.S. Pat. No. 5,236,962, the disclosure of which is incorporated by reference herein in its entirety.

The stabilized polyolefin composition is particularly suitable for manufacture into a fiber or film using conventional techniques and apparatus. More particularly, the stabilized olefin polymer may be extruded at conventional temperatures (i.e. 210° to 280° C.) through a die, quenched, partially or fully oriented and heat-set prior to winding upon a bobbin or being subjected to further processing such as spun bonding into a non-woven web.

A particularly preferred resin composition comprises 800 ppm 2,2',2"-nitrilo triethyl-tris(3,3',5,5'-tetra-tert.butyl-1,1-biphenyl-2,2'-diyl)phosphite, 400 ppm N,N-di(stearyl) hydroxylamine; 500 ppm tetrakis[methylene(3,5-di-tert.butyl-4-hydroxyhydrocinnamate)] methane, and 250 ppm calcium lactate as an acid neutralizing agent.

EXAMPLES

These Examples are presented for the purpose of illustration only, and should not be construed to limit the nature or scope of the invention disclosed herein in any manner whatsoever.

The chemical identities of the products used in the formulations below are as follows:

Olefin Polymers

PF-304 polypropylene polymer commercially available from Montell USA Inc.

PF-305 polypropylene polymer commercially available from Montell USA Inc.

Phosphites

Irgafos 12 2,2',2"-nitrilo[triethyl-tris(3,3',5,5'-tetra-tert.butyl-1,1-biphenyl-2,2'-diyl)phosphite], commercially available from Ciba Specialty Chemicals Corporation.

Irgafos 168 tris(2,4-di-tert-butylphenyl)phosphite, commercially available from Ciba Specialty Chemicals Corporation.

Ultranox 626 bis(2,4-di-tert-butylphenyl)pentaerythritol diphosphite), commercially available from GE Specialty Chemicals.

Ultranox 641 2,4,6-tri-tert-butylphenyl-2-butyl-2-ethyl-1, 3-propanediol phosphite, commercially available from GE Specialty Chemicals.

Hydroxylamines

FS-042 N,N-di(stearyl)hydroxylamine, commercially available from Ciba Specialty Chemicals Corporation.

Benzofuranones

HP 136 5,7-di-t-butyl-3-(3,4-dimethylphenyl)-3H-benzofuran-2-one, commercially available from Ciba Specialty Chemicals Corporation.

Hindered Phenolic Antioxidants

Irganox 1010 tetrakis[methylene 3-(3',5'-di-tert-butyl-4'-hydroxy-phenyl)propionate]methane, commercially available from Ciba Specialty Chemicals Corporation.

Irganox 1076 octadecyl-3,5-di-tert-butyl-4-hydroxy hydrocinnamate, commercially available from Ciba Specialty Chemicals Corporation.

Hindered Amines

Chimmassorb 119 1,3,5-triazine-2,4,6,-triamine-N,N"-[1, 2-ethanedylbis[N-(3-[4,6-bis-(butyl-1,2,2,6,6-pentamethyl- 4-piperidinyl)amine]propyl-[N,N-dibutyl-N,N-bis(1,2,2,6,6- pentamethyl-4-piperidinyl), commercially available from Ciba Specialty Chemicals Corporation.

Chimassorb 944 poly[6-[(1,1,3,3-tetramethyl-butyl) amino-s-triazine-2,4-yl]2,2,6,6-tetramethyl-4-piperindyl) imino]hexamethylene[(2,2,6,6,-tetramethyl-4-piperidyl) imino], commercially available from Ciba Specialty Chemicals Corporation.

inch fiber extruder and quenching under moderate conditions. Volatile organic compounds were measured and recorded from evolved smoke aspirated from the die orifice via a vacuum system to a sample chamber where a laser particle counter measured the concentration of volatile particles in milligrams per cubic meter. Results were recorded on a strip chart recorder. The sample formulations and their smoke measurements are listed below in Table 1:

TABLE 1

| Additives (ppm) | I-1 | PF-304 | I-3 | I-4 | I-5 | I-6 | I-7 | I-8 | I-9 | PF-305 | I-11 | I-12 | I-13 | I-14 | I-15 |
|---|---|---|---|---|---|---|---|---|---|---|---|---|---|---|---|
| Irgafos 12 | — | — | 1000 | 1000 | 1000 | 1000 | 1000 | 1000 | 1000 | — | 1250 | — | 1000 | 700 | 800 |
| GCA-042 | — | — | — | 250 | 250 | 250 | 250 | 250 | 250 | — | 250 | — | 250 | 300 | 400 |
| Irganox 1076 | — | 1000 | — | — | — | — | — | — | — | 1000 | — | — | — | 500 | 300 |
| DHT4A | — | 150 | 150 | 150 | 75 | — | — | — | — | — | 75 | 150 | 75 | 75 | 75 |
| CaO | — | — | — | — | — | — | — | 250 | 250 | — | — | — | — | — | — |
| Ca Stearate | — | — | — | — | — | — | — | — | 15 | 500 | — | — | — | — | — |
| Pationic 1240 | — | — | — | — | — | — | 250 | — | — | — | — | — | — | — | — |
| Chimassorb 944 | — | — | — | — | — | — | — | — | — | — | — | — | 250 | — | — |
| Tinuvin 622 | — | — | — | — | — | — | — | — | — | — | — | 1000 | — | — | — |
| Vitamin E | — | — | — | — | — | — | — | — | — | — | — | 500 | — | — | — |
| Properties: Smoke (mg/m$^3$) | 220 | 150 | 55 | 14 | 10 | 4 | 9 | 12 | 26 | 180 | 5 | 100 | 14 | 5 | 5 |

Tinuvin 622 poly-(N-β-hydroxyethyl-2,2,6,6-tetramethyl-4-hydroxy-piperidyl succinate), commercially available from Ciba Specialty Chemicals Corporation.

Miscellaneous

Pationic 1240 calcium lactate, commercially available from American Ingredients Company.

DHT-4A hydrotalcite, commercially available from Kyowa Chemicals Industry Co., Ltd.

Blends

FS-601 is a 1:1 blend of FS-042 N,N-di(stearyl) hydroxylamine and Irgafos 12 2,2',2"-nitrilo[triethyl-tris(3,3',5,5'-tetra-tert.butyl-1,1-biphenyl-2,2'-diyl)phosphite].

FS-301 is a 1:1 blend of FS-042 N,N-di(stearyl) hydroxylamine and Irgafos 168 tris(2,4-di-tert-butylphenyl) phosphite.

Ultranox 627A is a blend of 93% Ultranox 626 phosphite and 7% DHT4A hydrotalcite.

Irganox B-225 stabilizer is a blend of one part Irganox 1010 product and one part Irgafos 168 product described herein above, commercially available from Ciba Specialty Chemicals Corporation.

Example I

Fifteen polypropylene resin composition samples were evaluated for smoke generation. All samples were based on a polypropylene feedstock prepared from a commercially produced polypropylene flake having a xylene soluble content at room temperature of 4.0% and an initial MFR of 1.5 g/10 minutes, measured according to ASTM 1238, Condition L, and visbroken to a target MFR of 38 g/10 minutes.

The sample formulations were then mixed together in a Kokneader extruder and pelletized. Smoke generation was measured by extruding 10 pound samples of each formulation at a rate of 10 pounds/hour at 260° C. through a 1.25"

Examination of Table I illustrates the dramatic reduction in volatile organic compound generation exhibited by the present invention. More particularly, inventive samples I-3 through I-8, I-11 and I-13 through I-15 all achieved at least a 90% reduction in volatile organic compound generation in comparison to control sample I-1 which does not contain any stabilizer.

The deleterious effect of even a small amount of calcium stearate on volatile organic compound generation is demonstrated by comparison of samples I-8 and I-9. The presence of only 15 parts per million calcium stearate causes over twice as much smoke as generated by an otherwise identical sample formulation.

Comparison of samples I-2 and I-10 also evidences the deleterious effect of calcium stearate on measured smoke.

Example II

Polypropylene resin composition samples and control samples were evaluated for smoke generation. Two samples (II-1 and II-2) were based on a polypropylene feedstock prepared from a commercially produced polypropylene flake having an initial MFR of 4 g/10 minutes, measured according to ASTM 1238, Condition L, and visbroken to a target MFR of 25 g/10 minutes. The remaining samples (II-3 through II-14) were formulated using a devolatiled polypropylene feedstock prepared from a commercially produced polypropylene flake having an initial MEFR of 4 g/10 minutes visbroken to a target MFR of 38 g/10 minutes.

The samples were formulated and measured for smoke generation using the procedures and apparatus described above in Example 1, except for the use of premixed blends of N,N-dialkylhydroxylamine and phosphite. Control samples were run several times over the course of the evaluation due to a changing reading from the laser particle counter. The sample formulations and their smoke measurements are listed below in Table 2:

TABLE 2

| Additives (PPM) | PF-304 | II-1 | II-2 | PF-304 | II-3 | II-4 | II-5 | II-6 | II-7 | II-8 | II-9 | II-10 | II-11 | II-12 | II-13 | II-14 | PF-304 |
|---|---|---|---|---|---|---|---|---|---|---|---|---|---|---|---|---|---|
| Irgafos 12 | — | — | — | — | — | — | — | — | — | 1000 | 500 | 1000 | — | — | — | — | — |
| Irgafos 168 | — | — | — | — | — | — | — | — | 1000 | — | — | — | — | — | — | — | — |
| FS-601 | — | — | — | — | — | — | — | — | — | — | — | — | — | — | 1000 | 2000 | — |
| FS-301 | — | — | — | — | — | — | — | — | — | — | — | — | — | 1000 | — | — | — |
| Irganox 1076 | 1000 | 1000 | 300 | 1000 | 1000 | 300 | 150 | — | — | — | — | — | — | — | — | — | 1000 |
| Ultranox 627A | — | — | 600 | — | 600 | — | 300 | 1000 | — | — | — | — | 1000 | — | — | — | — |
| DHT4A | 150 | 150 | 150 | 150 | 150 | 150 | 150 | 150 | 150 | 150 | 150 | 150 | 150 | 150 | 150 | 150 | 150 |
| Tinuvin 622 | — | — | — | — | — | — | — | 500 | 500 | 500 | — | — | — | — | — | — | — |
| Properties: Smoke (mg/m$^3$) | 83 | 52 | 62 | 95 | 66 | 62 | 51 | 79 | 34 | 46 | 30 | 28 | 34 | 41 | 27.5 | 14.5 | 85 |

Examination of Table 2 illustrates the reduction in volatile organic compound generation possible with the use of either 2,2',2"-nitrilo[triethyl-tris(3,3',5,5'-tetra-tert.butyl-1,1-biphenyl-2,2'-diyl)phosphite] or tris(2,4-di-tert-butylphenyl) phosphite as the phosphite stabilizer, as well as the use of preblended mixtures of the N,N'-dialkylhydroxylamine and the phosphite stabilizer, and the non-preferential hydrotalcite.

Example III

A heterophasic olefin polymer material commercially available from Montell USA Inc. comprising (a) 35% of a propylene homopolymer having an isotactic index, defined as the xylene insoluble fraction, of 97.5, (b) 6.9% of a semi-crystalline ethylene-propylene copolymer that is insoluble in xylene at room temperature, and (c) 58.1% of an ethylene-propylene copolymer that is soluble in xylene at room temperature, was visbroken to a target MFR of 30 g/10 minutes. Three sample formulations were formulated according to the procedures of Example I and extruded by a Hills fiber apparatus through a 40-hole die at 260° C. Volatile organic compounds generated during extrusion were measured using a laser particle counter capable of expressing concentration in milligrams per cubic meter.

Table 3 lists the formulations and the amount of volatile organic compounds generated during extrusion. The first control sample (sample III-1, containing calcium stearate) generated an amount of volatile organic compounds which exceeded the calibration settings of the particle counter. Changing the acid neutralizing agent from calcium stearate to hydrotalcite (containing a minor amount of calcium stearate) (control sample III-2) reduced the generation of volatile organic compounds to within the measurement scale of the particle counter. However, concentrations of 260 milligrams per cubic meter is known to be an unacceptable level for fiber extrusion, and is believed to be likely to cause die deposits in film manufacturing. In contrast, sample III-3, which contained the inventive stabilizing system, exhibited significantly less generation of volatile organic compounds.

TABLE 3

| Additives (PPM) | III-1 | III-2 | III-3 |
|---|---|---|---|
| Irganox B225 | 1000 | 1000 | 1000 |
| Irgafos 12 | — | — | 700 |
| FS-042 | — | — | 400 |
| Calcium Stearate | 1000 | — | — |
| DHT4A | — | 150 | — |
| Pationic 1240 | — | — | 250 |
| Properties: Smoke (mg/m$^3$) | 300++ | 260 | 60 |

Example IV

Three samples were formulated using the polypropylene feedstock of Example I and according to the procedures and apparatus of Example I. The sample formulations and their smoke measurements are set forth in Table 4.

TABLE 4

| Additives (PPM) | IV-1 | IV-2 | IV-3 | IV-4 |
|---|---|---|---|---|
| Irganox 1076 | 1000 | — | — | — |
| Irgafos 12 | — | — | 800 | 800 |
| HP-136 | — | 100 | — | 100 |
| DHT4A | 150 | — | — | — |
| Pationic 1240 | — | 250 | 250 | 250 |
| Properties: Smoke (mg/m$^3$) | 220 | 180 | 130 | 40 |

We claim:

1. A polymer composition comprising
   (i) an olefin polymer containing an acid neutralizing agent other than a metallic salt of a saturated or unsaturated fatty acid, and
   ii) a stabilizer system distributed throughout said polymer, said stabilizer system comprising
      (a) a phosphite selected from the group consisting of 2,2',2"-nitrilo[triethyl-tris(3,3',5,5'-tetra-tert.butyl-1,1-biphenyl-2,2'-diyl)phosphite] and tris(2,4-di-tert-butylphenyl)phosphite; and
      (b) a N,N-dialkylhydroxylamine, a benzofuranone or mixtures thereof.

2. The polymer composition of claim 1, wherein said acid neutralizing agent is at least one member selected from the group consisting of hydrotalcites, aluminum silicate, and oxides and hydroxides of Group II metals.

3. The polyolefin composition of claim 2, wherein said acid neutralizing agent is selected from the group consisting of calcium lactate, calcium hydroxide, calcium oxide and mixtures thereof.

4. The polyolefin composition of claim 1, wherein said phosphite is 2,2',2"-nitrilo[triethyl-tris(3,3',5,5'-tetra-tert.butyl-1,1-biphenyl-2,2'-diyl)phosphite].

5. The polymer composition of claim 1, wherein said N,N-dialkylhydroxylamine conforms to the formula:

$$R_1R_2NOH$$

wherein $R_1$ and $R_2$ are independently $C_{1-36}$ alkyl, which is unsubstituted or substituted with hydroxyl.

6. The polymer composition of claim 5, wherein said N,N-dialkylhydroxylamine is N,N-distearylhydroxylamine.

7. The polymer composition of claim 5, wherein said N,N-dialkylhydroxylamine comprises di(hydrogenated tallow) hydroxyl amine.

8. The polyolefin composition of claim 1, wherein said stabilizer system is present in an amount of 250 to 2000 ppm polymer.

9. The polyolefin composition of claim 8, wherein said stabilizer system is present in an amount of from 700 to 1500 ppm polymer.

10. The polyolefin composition of claim 1, wherein said stabilizer system comprises 10 to 80% N,N-dialkylhydroxylamine and 90 to 20% phosphite.

11. The polymer composition of claim 1, further comprising (c) at least one other stabilizer compound, said other stabilizer comprising at least one member selected from the group consisting of a phenol, a hindered amine and a phosphite other than 2,2',2"-nitrilo [triethyl-tris(3,3', 5,5'-tetra-tert.butyl-1,1-biphenyl-2,2'-diyl)phosphite] or tris(2,4-di-tert-butylphenyl)phosphite.

12. The polyolefin composition of claim 11, wherein said other stabilizer compound is 2,4,6-tri-tert-butylphenyl-2-butyl-2-ethyl-1,3-propanediol phosphite.

13. The polyolefin composition of claim 11, wherein said other stabilizer compound is a hindered amine selected from the group consisting of poly[6-[(1,1,3,3-tetramethyl-butyl) amino-s-triazine 2,4-yl]2,2,6, 6-tetramethyl-4-piperidyl) imino]hexamethylene [(2,2,6,6,-tetramethyl-4-piperidyl) imino] and 1,3,5-triazine-2,4,6,-triamine-N,N"-[1,2-ethanedylbis[N-(3-[4, 6-bis-(butyl-1,2,2,6,6-pentamethyl-4-piperidinyl)amine]propyl-[N,N-dibutyl-N,N-bis(1,2,2,6,6-pentamethyl-4-piperidinyl]).

14. The polyolefin composition of claim 11, wherein said other stabilizer compound is a phenol selected from the group consisting of tetrakis[methylene(3,5-di-tert.butyl-4-hydroxyhydrocinnamate)]methane and tetrakis[methylene 3-(3',5'-di-tert-butyl-4'-hydroxy-phenyl) propionate] methane.

15. The polymer composition of claim 1, wherein said olefin polymer is either a crystalline propylene homopolymer having an isotactic index greater than 90 or a crystalline, random copolymer of propylene and either ethylene or $C_4$–$C_{10}$ 1-olefins.

16. The polymer composition of claim 1, wherein said olefin polymer is a visbroken polypropylene having a melt flow rate of 15 to 50 g/10 minutes, measured according to ASTM 1238, Condition L.

17. The polymer composition of claim 16, wherein said melt flow rate is 25 to 38 g/10 minutes, measured according to ASTM 1238, Condition L.

18. A method for preparing a olefin polymer fiber, film or sheet, comprising i) incorporating a stabilizer system into an olefin polymer containing an acid neutralizing agent other than a metallic salt of a saturated or unsaturated fatty acid, said stabilizer system comprising
(a) a phosphite selected from the group consisting of 2,2',2"-nitrilo[triethyl-tris(3,3',5,5'-tetra-tert.butyl-1, 1-biphenyl-2,2'-diyl)phosphite] and tris(2,4-di-tert-butylphenyl) phosphite; and
(b) a N,N-dialkylhydroxylamine, thereby producing a stabilized olefin polymer; and ii) extruding said stabilized olefin polymer through a die, thereby producing an olefin polymer fiber film or sheet.

19. A fiber produced according to the process of claim 18.

20. A film or sheet produced according to the process of claim 18.

* * * * *